L. B. TILLERY.
GAGE.
APPLICATION FILED AUG. 20, 1914.

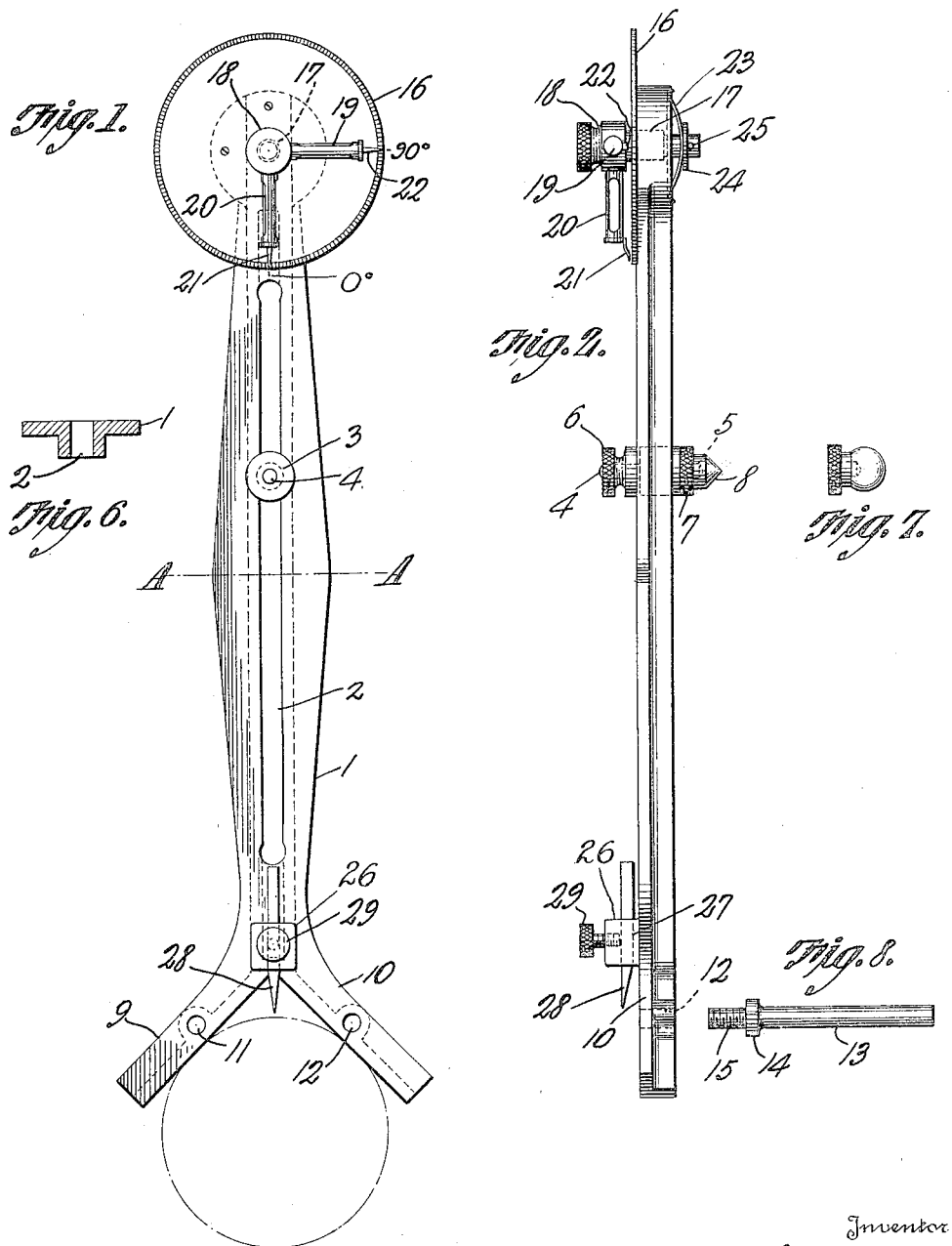

1,134,297.

Patented Apr. 6, 1915.
2 SHEETS—SHEET 2.

Witnesses
Ed. R. Lusby
W. W. Rockwell

Inventor
Lynn B. Tillery
By Parker Cook
Attorney

UNITED STATES PATENT OFFICE.

LYNN B. TILLERY, OF ROCKY MOUNT, NORTH CAROLINA.

GAGE.

1,134,297. Specification of Letters Patent. Patented Apr. 6, 1915.

Application filed August 20, 1914. Serial No. 857,694.

*To all whom it may concern:*

Be it known that I, LYNN B. TILLERY, a citizen of the United States, and a resident of Rocky Mount, county of Nash, and State of North Carolina, have made and invented certain new and useful Improvements in Gages, of which the following is a specification.

My invention relates to a new and useful improvement in gages, and more particularly to a gage especially designed for accurately quartering locomotive wheels, laying off key ways on axles, and shafts, or on axles for eccentric blocks, etc.

An object of my invention is to produce a tool of the character described, that will be absolutely accurate, of but few parts, and of such simple operation that the method of applying the same will be readily seen.

Still another object of my invention is to produce a tool of the character described that will be neat in appearance, easy to construct, cheap to manufacture, of but few moving parts and accurate in its calculation.

It will be understood that it is highly essential that the crank pins of the driving wheel of a locomotive be set at 90 degrees to each other or as it is commonly known, quartered. The general method of determining whether or not a pair of driving wheels of the locomotive has been properly quartered necessitates that one of the crank pins be placed on exactly the top or bottom quarter, or if the wheels are already in place under the locomotive and there is a question as to whether or not they have been properly quartered and placed, it is generally necessary to remove the side rods from the crank pins in order to determine the same.

With my gage to be hereinafter fully described it is not necessary that the wheels be placed in any certain fixed position, or if it is desired to determine whether the driving wheels already on the locomotive have been correctly placed in position, the tool can be readily applied without necessitating the removal of the side rod, as generally is the case. Again, key ways on axles for eccentric blocks are always so many degrees from a given point and with the gage as herein disclosed the exact location of the key ways on the eccentric blocks, so many degrees from a given point may be determined at once.

Figure 3:
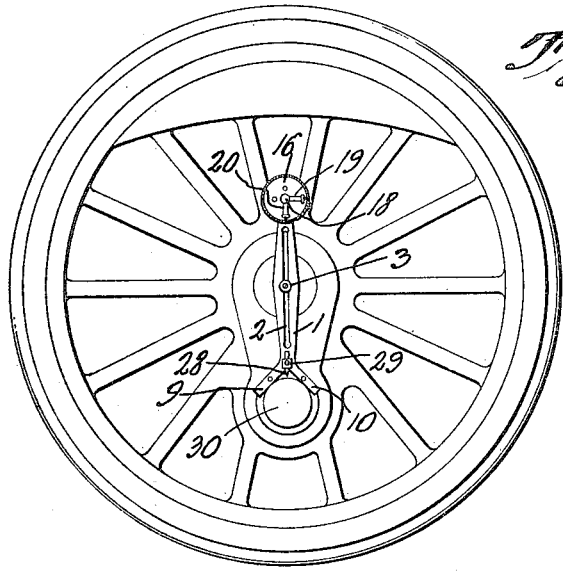
Figure 5:
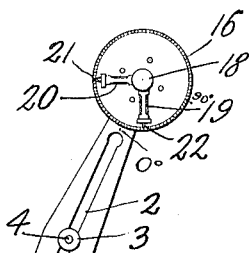
Figure 4:
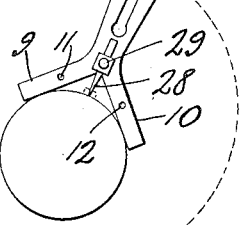

In the drawing accompanying and forming part of the specifications, and wherein like numbers designate similar parts, it will be seen, that, Figure 1 is a front elevation of my improved gage. Fig. 2 is a side elevation of the same. Fig. 3 shows the gage in position on one of the driving wheels. Fig. 4 is a similar view and showing the tool in its correct position on the opposite driving wheel. Fig. 5 is a view in elevation showing the gage applied to an eccentric block on the axle for locating the key way to be cut in said axle. Fig. 6 is a sectional view taken on line A—A in Fig. 1. Fig. 7 shows a large centering nut. Fig. 8 shows a pin to be positioned in the arms of the body of the gage.

Referring now to the drawings, it will be seen that the gage consists of a body portion 1 practically of about 20 inches in length, which is provided with a longitudinal slot 2, which extends nearly the entire length of the body portion 1, and in which is located the adjustable centering pointer 3, provided on its one face with the screw-threaded shank 4, and on its other face with the screw-threaded shank 5, on one of which shanks is located the thumb-nut 6, and located on the other screw-threaded shank 5 is the nut 7, this nut being provided with the point 8. It will be seen that this adjustable centering pointer may freely pass up and down in the longitudinal slot 2 and may be set at any point and held in position by simply tightening the thumb-nut 6.

Located at the lower end of the body portion 1 are the two arms 9 and 10, each of which extends to an angle of 45 degrees from the body and at an angle of 90 degrees to each other. Midway of the length of each of these arms are formed the openings or holes 11 and 12, which are then tapped for the reception of pins 13, as clearly shown in Fig. 8, which pins are provided on their inner ends with the collar 14, and a screw-threaded shank 15. It will thus be seen that if a crank pin is in place, the arms 9 and 10 may straddle the same, or if the calculation is to be made, and the crank pin is not in the hole, the pins 13 will be placed in the arms and then placed in the crank pin hole, and the gage centered in the same manner as if the arms 9 and 10 were straddling the crank pin.

Located at the upper end of the body portion 1, of the gage and securely fastened thereto is the dial 16, the center of which is directly above and in line with the longitudinally extending slot 2, the said dial being graduated in marks of degree.

Passing through an opening in the center of the dial 16, is the pin 17 on which is located the thumb-nut 18, to which are rigidly secured the spirit vials 19 and 20, and which are provided at the outer ends with the pointers 21 and 22.

As before mentioned, the spirit vials are rigidly secured to the thumb-nut 18, and at an angle of 90 degrees to each other. Thus it will be seen, as is clearly shown in Fig. 1, if the pointer of one spirit vial is at zero and directly over the center of the longitudinal slot 2, the pointer of the other vial 19 will point to exactly 90 degrees on the dial 16, and any movement of the nut 18, will cause both spirit vials to move, but they will always remain at an angle of 90 degrees to each other.

Located at the rear of the pin 17, is a spring 23, which bears against a collar or washer 24, on the pin 17, which washer is held by a pin 25, so that the spring 23 will rest against the said collar or washer 24, and the rear of the body portion 1, and in this manner exert a tension on the pin 17 so that the same with the vials thereon will remain in its set position until turned by the thumb-nut 18. Again, located at the base of the body portion 1 of the gage, and at the junction of the upper end of the two arms 9 and 10, and directly under and in line with the longitudinal slot 2, is a knob or projection 26, which is provided with a hole or opening 27, this hole being also parallel with the longitudinally extending slot 2, and located in this hole is the scribe point 28, which as clearly shown in Fig. 2 is ground off center, and may rotate and move upwardly or downwardly in the said hole 27, and be held in its set position by the thumb screw 29.

In Fig. 7 is shown a somewhat larger contacting point for the adjustable pointer heretofore described which may be placed on the shank 5 if the centering point of the axle is too large for the point heretofore referred to.

In operation, the improved gage is used as follows: Presuming the driving wheels are already set on the axle and it wished to determine whether the same are properly quartered, and presuming for the sake of clearness the wheels are in position as shown in Figs. 3 and 4, although it will be seen that any position might be just as well taken, my improved gage is placed above the crank 30, with the arms 9 and 10, resting thereon; the body portion of the gage is placed against the axle of the wheel and the adjustable centering pointer 3 moved until it comes directly opposite the center of the said axle, the thumbnut with the spirit vials thereon set so that the one 19 will be level. Now as the other wheel is supposed to be correctly quartered, or at 90 degrees from the first mentioned wheel, the gage is applied in the same manner to the last mentioned wheel, centered in the same manner by the adjustable centering pointer, and as the spirit levels are set at 90 degrees with respect to each other, and as this mentioned wheel is supposed to be set at 90 degrees from the first mentioned wheel, or quartered, then the spirit level 20, now should be level; if this is not so, the thumb screw 18 is moved until the spirit vial 20 correctly centers or levels, and the number of degrees that the spirit vial is moved as shown on the dial will be the number of degrees that the wheel will have to be changed to have them properly quartered. If again we wish to find the proper position for the wheels on the axles and the crank pins have not been put in place, the pins 13 are placed in the arms 9 and 10 and inserted in the crank pin hole, and the above mentioned procedure again followed. In other words as the spirit vials are always set at a difference of 90 degrees, if one is set so that the vial centers or levels, it is only necessary to swing the gage to a distance of 90 degrees, or until the other one centers or levels, and we have the exact location for the other wheel. Again, if we desire to determine the key way on axles for an eccentric block, and knowing that it is so many degrees from a given point, place the gage upon the pin in an upright position so that the one spirit level will register zero on the face of the dial of the wheel, set the spirit vial to the number of degrees from zero that is desired, then move the tool until the spirit vial which has previously been set is level, and this will be the exact and proper location for the eccentric key. Move the scribing point 28, first loosening the same by the thumb nut 29, and revolve it, thereby scribing a very small circle, showing the exact location of the key way to be cut for the eccentric blocks, and the desired number of degrees from the given point.

From the foregoing, it will be seen that the gage although designed for the quartering of locomotive drive wheels and locating keys on axles, etc., may be used for many and various purposes.

It will also be seen that the gage is one of simple construction, that its mode of operation is extremely simple and that it may be quickly understood by any one familiar with the use of tools.

It will also be understood that any slight changes or modifications of forms might be used without departing from the spirit and scope of my invention.

Having thus described my invention, what I claim as new and desire to secure by Letters Patent, is,

1. An article of the character described comprising an elongated body portion provided with a longitudinally extending slot and angular arms located at one end of said body portion and disposed centrally thereof, spirit vials pivoted at the other end of said body portion and centering means carried in said elongated slot and parallel with the axis of said spirit vials and the apex of the angularly disposed arms.

2. An article of the character described comprising an elongated body portion provided with an elongated slot therein, spirit vials pivoted to said body portion and capable of making a complete revolution, said spirit vials arranged in fixed relation to each other, angularly disposed arms at one end of said body portion, the apex of said arms being in the medial plane of the said elongated slot and centering means adjustable in said elongated slot and parallel with the axis of said spirit vials and the apex of the angularly disposed arms.

3. An article of the character described comprising an elongated body portion provided with a longitudinally extending slot, angularly disposed arms at one end of said body portion and the apex of the arms being in the medial plane of the enlongated slot of the body portion, a circular dial graduated in degrees located at the other end of said body portion, spirit vials pivoted at the center of said dial arranged in fixed relation with each other and the axis of said vials being in the medial plane of the elongated slot of said body portion, and the apex of the said angularly disposed arms.

4. An article of the character described, comprising a body portion, spirit vials carried thereby adjustable with regard to said body portion and in fixed relation to each other, angularly disposed arms at one end of said body portion, and centering means located between said spirit vials and said arms, the point of which is disposed at right angles to the long dimension of said body portion.

5. An article of the character described, comprising a body portion, spirit vials located at the upper portion thereof, said spirit vials adjustable with regard to said body portion and in fixed relation to each other, arms located at one end of said body portion, and disposed at an angle of 90 degrees to each other, and adjustable centering means carried by said body portion, the point of which is disposed at right angles to the long dimension of said body portion.

6. An article of the character described, comprising a body portion provided with a longitudinally extending slot, spirit vials pivoted at the upper end of said body portion and in fixed relation to each other, arms located at one end of said body portion and at an angle of 45 degrees thereto, and adjustable centering means located in said longitudinally extending slot, and the point of which is disposed at right angles to the long dimension of the body portion.

7. An article of the character described, comprising a body portion provided with a longitudinally extending slot therein, a dial graduated in degrees located at one end of said body portion, spirit vials pivoted at the center of the dial, and in fixed relation to each other, adjustable centering means located in said slot, the point of which is disposed at right angles to the long dimension of the body portion, means for holding the same in its adjusted position, and arms located at the other end of said body portion disposed at an angle of 45 degrees to said body portion and at 90 degrees to each other.

8. An article of the character described, comprising a body portion provided with a longitudinally extending slot, spirit vials carried at one end of said body portion, adjustable with regard thereto and in fixed relation to each other, centering means located in said slot, and arms extending at an angle of 45 degrees from the other end of said body portion, and provided with outwardly extending positioning pins.

9. An article of the character described, comprising abody portion, spirit vials pivoted at one end thereof capable of making a complete revolution and in fixed relation to each other, angularly disposed arms located at the other end of said body portion, and disposed centrally thereof and a scribing point carried by said body portion, and located at an angle of 45 degrees from each of said arms.

10. An article of the character described, comprising a body portion provided with a longitudinally extending slot, a scale carried at one end of said body portion, spirit vials pivoted at the center of said scale and in fixed relation to each other, adjustable centering means carried in said slot, arms located at the other end of said body portion, and located at an angle of 45 degrees to said body portion and at 90 degrees to each other, and an adjustable scribing point, located at the inner end of said arms, and bisecting the angle formed thereby, and means for holding the said point in its adjusted position.

11. An article of the character described, comprising a body portion provided with a longitudinally extending slot therein, a dial located at one end of said body portion, spirit vials pivoted at the center of said dial, and in fixed relation to each other, means for holding them in their adjusted position, adjustable centering means located in said longitudinally extending slot, arms located at the other end of said body portion, and disposed at an angle of 45 degrees thereto and at 90 degrees to each other, said arms provided with openings therein, positioning pins adapted to fit within said openings, and a scribing point located directly beneath said longitudinally extending slot and bisecting the angle formed by the said arms, and means for retaining said scribing point in its fixed position.

Signed at Rocky Mount and State of North Carolina, this 12th day of August A. D. 1914.

LYNN B. TILLERY.

Witnesses:
JOHN MOOVHER,
T. C. ROBBINS.